Aug. 4, 1936.  E. A. STALKER  2,049,572

AERODYNAMIC CONTROL OF AIRCRAFT

Filed Dec. 12, 1934

INVENTOR

Edward A. Stalker

Patented Aug. 4, 1936

2,049,572

UNITED STATES PATENT OFFICE 2,049,572

AERODYNAMIC CONTROL OF AIRCRAFT

Edward A. Stalker, Ann Arbor, Mich.

Application December 12, 1934, Serial No. 757,149

14 Claims. (Cl. 244—12)

My invention relates to the aerodynamic control of aircraft through means employing the modification of the boundary layer. It contains subject matter also contained in my pending application Serial No. 736,378, entitled Wings, and filed July 21, 1934.

The objects of my invention are; first, to provide rolling moments accompanied by proper yawing moments; second, to extend the regime of proper rolling and yawing moments beyond the normal range of angles of attack. Other objects will appear from the description accompanying the drawing.

I accomplish the above results by the devices illustrated in the accompanying drawing in which—

Figure 5 is a vertical section along the line 5—5 in Figures 1 or 2;

Similar numerals refer to similar parts throughout the several views.

Figure 1:
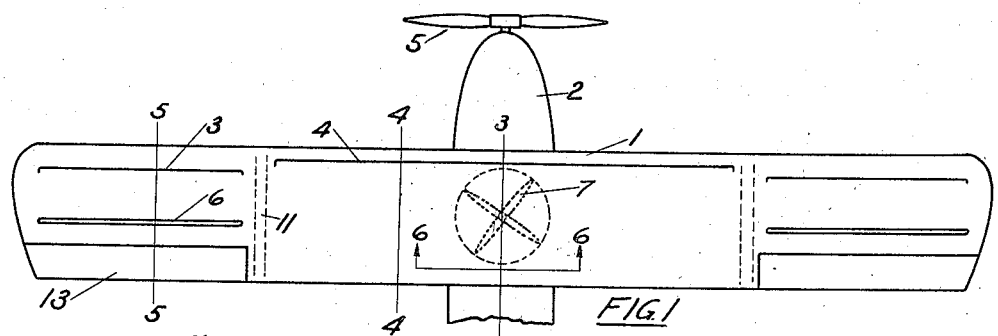
Figure 1 is a fragmentary top plan of the aircraft.

Before proceeding with the description it is pertinent to discuss certain phases of the theory.

When an aircraft is banked by the use of an aileron or other device the yawing moment should be either neutral or slightly in the direction of the turn. That is, the rising wing should also have a tendency to advance more rapidly than the declining wing. Ordinary ailerons give the reverse action.

When the aileron is depressed on one side of the airplane the lift increases and along with it the induced drag which is a function only of the lift and the span. The aileron on the opposite side is raised and the lift is decreased with a resultant decrease of induced drag. These drag changes are obviously of the wrong sign and cause an adverse yawing moment. It is one object of this invention to remedy this defect.

Ailerons, as is well known, become ineffective near the angle of maximum lift of the wing. There is a very definite ultimate maximum lift for conventional wings due to a change in angle of attack or camber. An ordinary aileron gives a rolling moment by changing both the angle of attack and camber of the outer portion of the wing. If the wing is already flying at maximum lift angle a further increase in angle of attack by a depression of the aileron will not lead to a further increase in lift.

It is known that the ultimate value of the maximum lift for a conventional wing can be increased by an energization of the boundary layer on the wing surface.

Briefly, energization of the boundary layer consists in adding energy to it by blowing out a slot or by drawing the boundary layer into the wing interior. Both methods in effect suppress it. When blowing is used the jet should be directed rearward along the wing surface preferably tangentially thereto. The jet must not be discharged normal to the surface because it will not then impart any velocity to the fluid in the direction of flow along the surface. Such normal discharge will merely induce turbulence in the flow in opposition to the purpose of boundary energization to reduce it.

Any air discharged from a slot into the boundary layer must have at least as much energy or velocity as the boundary layer, more if energization is to take place. Air of lower energy or velocity when mixed with the boundary layer will serve only to de-energize the boundary layer since after mixing, the energy or velocity per unit volume will be less.

Referring to the figures, it will be noted that two means of energizing the boundary layer are provided. The wing 1 mounted on the fuselage 2 has a through slot 3 from which a jet can issue and it also has the surface slot 4. Also, a suction or induction opening 6 is provided. The induction slots 6, one on each side of the center of the span, are normally open for the induction of the boundary layer for a neutral position of the steering control.

Within the wing 1 is a blower 7 whose rotation about the vertical shaft 8 draws air from the upper compartment 9 and forces it into the lower compartment 10. The slot 4 is in communication with the compartment 10 and so the fan discharges the inducted air out the surface slot rearward along the wing surface.

Figure 2:
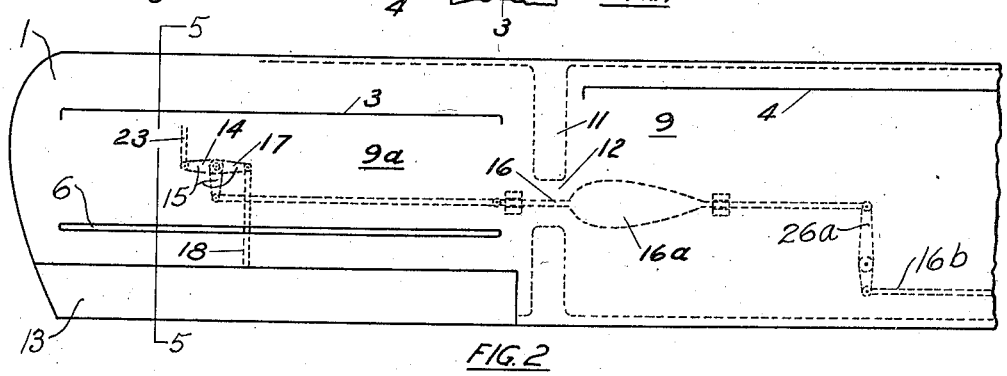
Figure 2 is a fragmentary top plan of the wing.
Figure 4:
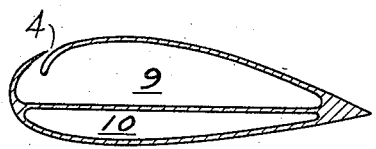
Figure 4 is a vertical section along the line 4—4 in Figure 1.
Figure 3:
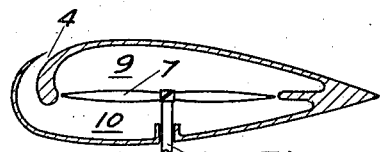
Figure 3 is a vertical section along the line 3—3 in Figure 1.

The suction or upper compartment 9 extends toward the wing tips to the vertical chordwise partition 11 shown particularly in Figure 2. There is also a compartment 9a between the wing tip and the partition 11. There is communication between the compartments 9 and 9a through the partition 11 by means of the opening 12. See Figure 2 particularly since the partition opening is not shown in Figure 1 for the sake of clearness.

The lower compartment 10 extends only to the partition 11 and at this section the wing section changes smoothly from the convex lower surface type to a relatively flat bottom type, as shown in Figure 5. This is not essential and either type of wing section could be used on any portion of the wing. The significant point is that the suction compartment 9a is substantially distinct from the pressure compartment 10.

Under normal conditions of level flight the fan 7 is continuously inducting air at the slot 6 and there is a flow of air through the through slot 3. When the aileron 13 is moved down at large angles of attack of the wing the flow follows the wing contour and there is an increase of lift to roll the airplane. If the boundary layer energization available from the slots 3 and 6 were not present the flow would fail to follow the surface and no lift to roll the airplane would be available.

Figure 6:
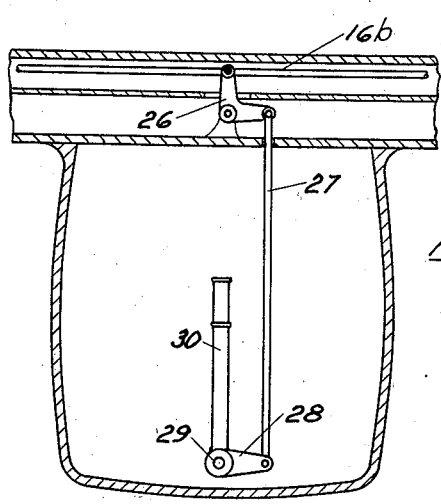
Figure 6 is a fragmentary vertical spanwise section of the fuselage looking forward as indicated by the section line 6—6 in Figure 1.

The aileron is actuated by the conventional bell crank system and rods. As shown in Figures 2, 5 and 6 a bracket 14 supports the double bell crank 15 which is rotated by the rod 16. From the crank arm 17 a rod 18 extends rearward to an articulated connection on the aileron which is hinged to the wing at 19. It is obvious that pushing on the rod 16 will raise the trailing edge of the aileron.

The wall of the through slot is perforated to form a passage 20 into the compartment 9a and this passage is closeable by a flap 21 extending spanwise along the length of the through slot. The flap is hinged at the top at 22.

The flap is actuated by a rod 23 extending from the bell crank 24 to the flap and joined at each end preferably by a ball and socket or universal joint. A push on the rod 16 will cause the flap to swing forward into the through slot 3 as indicated by the dotted lines in Figure 5. It is to be remembered that the aileron is raised by the push on rod 16 so that the conditions are proper to cause the wing tip to decline. It is also to be recalled that for this condition an increase in drag is desirable.

The lift is decreased both by the up movement of the aileron and the spoilage of the flow over the upper surface. The flow is spoiled in the first place by the flow out of compartment 9a through the slot 5 which deenergizes the boundary layer. Also, the flap 21 in the position shown dotted does not touch the forward wall of the slot but actually permits a quantity of air to pass which is made turbulent by the abrupt change in contour. The advent of this air to the upper surface also aids in de-energizing the boundary layer. The destruction of the flow decreases the lift and increases the drag.

The action of the fan 7 is not affected adversely by the admission of air to the compartment 9a because the rod 16 carries a plunger 16a which is thrust into the hole 12 by the outward movement of the rod 16. Thus the full suction of the fan is devoted to the opposite tip of the wing.

When the aileron is depressed to create a lift and rolling moment the flap 21 moves inward into compartment 9a but the passage of air is prevented by a lip 25 formed on the lower edge of the opening 20. The flap 21 also fits tightly against suitable surfaces at its ends to prevent an inflow into 9a. The lip 25 is sufficiently long to provide for the full down travel of the aileron.

The push rod 16 is actuated by the conventional lever 26a, bell crank 26, rods 16b and 27, and arm 28 connected to the torque tube 29 which is rotatable by the control stick 30. See Figure 6.

The fan is rotated either by the engine or the propeller acting as a windmill. This method of operation is described in my Patent No. 1,913,644 granted June 13, 1933, entitled Means of energizing the boundary layer on aircraft parts. Briefly, the method consists in driving the fan 7 by the engine through an over-running or disengageable clutch so that in case of engine failure the fan 7 is rotatable by the propeller acting as a windmill or turbine. By means of the clutch the turbine to fan drive is relieved of the torque load of the dead engine.

The slots extending along the major portion of the span insures the attainment of a high lifting capacity. The additional slots in the tip portions insures that the lift of these portions can be higher than the central portions; or in other words, that the lift of the tip portions can be higher than the average lift for the whole wing. Hence when the wing as a whole is operating at maximum lift the tip portions are operating at something less than their maximum possible lift.

It will now be clear that due to the modifications induced in the boundary layer the rolling moment may be large at large angles of attack. The increase in rolling moment over the conventional wing arises both from an increase and a decrease in the left over appropriate portions of the wing. Along with the decrease in lift there is an increase in drag so as to provide the proper yawing moments. The total result is to provide powerful control moments at all angles of attack which are especially useful at the large angles of attack. At the latter angles the spins which are the cause of most accidents begin. The control here provided is powerful enough and is available at the proper attitude to eliminate this hazard of flight.

I use the term vane to represent any movable surface whether a part of another wing or not. I use the term tilting moment to refer to moments generally.

Although I have illustrated a certain chordwise order of the slots it is to be understood that this order can be reversed.

While I have illustrated a preferred and specific form of the invention it is to be understood that I do not limit myself to these exact forms but intend to claim my invention broadly as defined in the appended claims.

I claim:

1. In an aircraft, a wing to support the aircraft and having a through slot extending along the span to convey the relative wind from below to above the wing and increase the maximum lifting capacity, a perforated upper surface of the wing to form a surface slot in communication with the wing interior, and controllable means to divert the flow in the through slot to the said surface slot.

2. In combination, a wing having a through slot to convey the relative wind from below to above the wing, a perforated upper surface of the wing to form a slot in communication with the wing interior, and controllable means to place the said wing interior in communication with the flow in the through slot and at least in part barricade the through slot to restrict its flow to the upper surface.

3. In combination in an aircraft, a wing having a through slot to convey the relative wind from below to above the wing, walls defining a compartment on each side of the longitudinal axis of the aircraft, a perforated upper surface of the wing to form slots leading into the compartments, means to at least partially stop the flow in the through slot, and means to cause an outflow through at least one of said surface slots in coordinated relation with said means to stop the flow through the through slot.

4. In combination in an aircraft, a wing having a through slot to convey the relative wind from below to above the wing, a vane means to induce a tilting moment on the aircraft, walls defining a compartment on each side of the longitudinal axis of the aircraft, a perforated upper surface of the wing to form slots leading into the compartments, means to at least partially stop the flow in the through slot, and means to cause an outflow through at least one of said surface slots in coordinated relationship with said means to stop the flow through the through slot and with the said vane means.

5. In an aircraft, a steering mechanism, a wing having a through slot on each side of the longitudinal axis of the aircraft to convey the relative wind from below to above the wing, a perforated upper surface of the wing to form a surface slot in communication with the wing interior, and means controllable by the steering mechanism to place the wing interior in communication with the flow in the through slot on one side of said axis to admit a flow to the surface slot to create a moment on the aircraft.

6. In combination in an aircraft, a wing having an upper surface discharge slot formed for the discharge of fluid rearward with respect to the direction of flight and along the wing surface, a means to convey a flow to the slot for discharge therefrom, a perforated upper surface to form a second slot on each side of the longitudinal axis of the aircraft in communication with the wing interior, and means to control communication between the flow to the said discharge slot and at least one of the said second slots so as to create a rolling moment on the aircraft, said second slots being directed away from the wing upper surface behind the slot to destroy the local lift by the discharge of fluid.

7. In combination in an aircraft, a wing having a control compartment near each lateral extremity and an energization compartment, means of communication between the control compartment and the energization compartment, a perforated upper surface of the wing to form slots leading into said control and energization compartments, means to admit air to a control compartment for passage out its surface slot, and controllable means to at least partially stop communication between the control compartment and said energization compartment during the said admission of air.

8. In combination in an aircraft, a wing having a control compartment near each lateral extremity and an energization compartment, means of communication between the control compartment and the energization compartment, a perforated upper surface of the wing to form slots leading into said control and energization compartments, means to admit air to a control compartment for passage out its surface slot, and means to substantially prevent the said admission of air while there is substantial communication between the energization compartment and said control compartments.

9. In combination in an aircraft a wing having a first upper surface slot, a perforated upper surface to form a second slot on each side of the longitudinal axis of the aircraft in communication with the wing interior, means of communication between the first and second slots, and means to control communication between the first slot and at least one of the said second slots to create a moment on the aircraft.

10. In an aircraft, a wing to support it and having in its surface a spanwise discharge slot on each side of the longitudinal axis of the aircraft, said wing having a perforated upper surface to form induction slots extending spanwise on each side of said axis, means providing for a flow of fluid through said slots, and controllable means to govern the flow of fluid through the slots differentially both with respect to slots on opposite sides of the said axis and with respect to the discharge and induction slots.

11. In combination in an aircraft, a wing having compartments on opposite sides of the longitudinal axis of the aircraft and a cell and a perforated upper surface of the wing to form a slot in communication with each compartment for use in energizing the boundary layer, means to alter the air pressure in the cell, and controllable means to establish communication between a compartment on one side of said axis and the cell and to admit air to the tip compartment on the opposite side of said axis for discharge out the surface slot.

12. In an aircraft, a wing having a hollow interior within at each wing tip and at least two chordwise-spaced spanwise slots in the upper surface near each wing tip, means providing for a flow of fluid through said slots, an aileron near each wing extremity, means of communication between chordwise-spaced slots at the same wing tip through the wing interior, and controllable means to suppress the said communication operable in coordination with the depression of the trailing edge of said aileron.

13. In an aircraft in combination a wing having a hollow interior and two chordwise-spaced spanwise slots in the upper surface near each wing tip, at least one inlet opening directed into the relative wind, means providing for communication through the wing interior to the said inlet opening or openings to cause a flow through the slots and for communication between the said slots, an operable roll inducing device altering the wing lift for use in lateral control of the aircraft, and controllable means to close communication between the said slots at a wing tip while maintaining communication through the wing to said inlet opening or openings for at least one of the said slots and to operate the said roll inducing device to raise the wing tip having said closed communication between the slots, said combination providing effective energization of the boundary layer of the wing to cooperate with the action of said roll inducing device.

14. In an aircraft, a wing having a hollow interior within at each wing tip and at least two chordwise-spaced spanwise slots in the upper surface near each wing tip, means providing for a flow of fluid through said slots, an aileron near each wing extremity and controllable means to establish communication between two chordwise-spaced slots through the wing interior at a wing tip in coordination with an upward movement of the trailing edge of the aileron at the same wing tip as the slots and to substantially suppress said communication for a depression of the trailing edge of said aileron.

EDWARD A. STALKER.